(12) United States Patent
Qi et al.

(10) Patent No.: US 8,382,970 B2
(45) Date of Patent: Feb. 26, 2013

(54) METALLIZATION PROCESS FOR MAKING FUSER MEMBERS

(75) Inventors: Yu Qi, Oakville (CA); Qi Zhang, Mississauga (CA); Yuning Li, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 519 days.

(21) Appl. No.: 12/186,460

(22) Filed: Aug. 5, 2008

(65) Prior Publication Data

US 2010/0032308 A1 Feb. 11, 2010

(51) Int. Cl.
*C25D 5/50* (2006.01)
*C25D 5/54* (2006.01)
*C25D 5/56* (2006.01)
*C23C 28/02* (2006.01)
*C23C 28/00* (2006.01)

(52) U.S. Cl. ........ 205/184; 205/159; 205/164; 205/166; 205/194; 205/196; 205/227

(58) Field of Classification Search .................. 205/159, 205/164, 166, 184, 227, 194, 196
See application file for complete search history.

(56) References Cited

U.S. PATENT DOCUMENTS

| 4,797,307 A * | 1/1989 | Kunimoto et al. ............. 427/386 |
| 5,130,192 A * | 7/1992 | Takabayashi et al. ........ 428/332 |
| 5,501,881 A | 3/1996 | Fuller et al. |
| 5,512,409 A | 4/1996 | Henry et al. |
| 5,729,813 A | 3/1998 | Eddy et al. |
| 7,054,589 B2 | 5/2006 | Okayasu et al. |
| 7,060,349 B2 | 6/2006 | Tamemasa et al. |
| 2006/0073667 A1 * | 4/2006 | Li et al. ......................... 438/311 |
| 2006/0254502 A1 * | 11/2006 | Garrou et al. .................. 117/84 |
| 2006/0254504 A1 * | 11/2006 | Dai et al. ......................... 117/84 |
| 2007/0237977 A1 * | 10/2007 | Thomsen et al. ............. 428/607 |

FOREIGN PATENT DOCUMENTS

JP 2004070155 A * 3/2004

OTHER PUBLICATIONS

Supriya, "Assembly of Conductive Colloidal Gold Electrodes on Flexible Polymeric Substrates Using Solution-Based Methods", Dissertation, © no month, 2005.*
Li et al., "Preparation of Surface Bound Silver Nanoparticles on Polyimide by Surface Modification Method and Its Application on Electroless Metal Deposition", Applied Surface Science (no month, 2004), vol. 233, pp. 299-306.*
Supriya et al., "Colloidal Au/Linker Molecule Multilayer Films: Low-Temperature Thermal Coalescence and Resistance Changes", Chem. Mater. (no month, 2005), vol. 17, pp. 4325-4334.*

* cited by examiner

*Primary Examiner* — Edna Wong
(74) *Attorney, Agent, or Firm* — Pillsbury Winthrop Shaw Pittman LLP

(57) ABSTRACT

The presently disclosed embodiments are directed to an improved metallization process for making fuser members which avoids the extra steps of metal nanoparticle seeding or special substrate treatment. In embodiments, a metallized substrate, formed by dip-coating or spraying with a metal nanoparticle dispersion which is subsequently thermally annealed, is used for the complete fabrication of the fuser member.

15 Claims, No Drawings

METALLIZATION PROCESS FOR MAKING FUSER MEMBERS

BACKGROUND

The presently disclosed embodiments relate generally to layers that are useful in imaging apparatus members and components, for use in electrostatographic, including digital, apparatuses. More particularly, the embodiments pertain to an improved metallization process for making fuser members, such as for example, inductively heated fuser belts.

In electrophotography, also known as xerography, electrophotographic imaging or electrostatographic imaging, the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. Charge generated by the photoactive pigment move under the force of the applied field. The movement of the charge through the photoreceptor selectively dissipates the charge on the illuminated areas of the photoconductive insulating layer while leaving behind an electrostatic latent image. This electrostatic latent image may then be developed to form a visible image by depositing oppositely charged particles on the surface of the photoconductive insulating layer. The resulting visible image may then be transferred from the imaging member directly or indirectly (such as by a transfer or other member) to a print substrate, such as transparency or paper. The imaging process may be repeated many times with reusable imaging members. The visible toner image thus transferred on the print substrate, which is in a loose powdered form and can be easily disturbed or destroyed, is usually fixed or fused to form permanent images. The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time is provided. The balancing of these parameters to bring about the fusing of the toner particles is well known in the art, and they can be adjusted to suit particular machines or process conditions.

Fuser and fixing rolls or belts may be prepared by applying one or more layers to a suitable substrate. Typically, fuser and fixing rolls or belts comprises a surface layer for good toner releasing. Cylindrical fuser and fixer rolls, for example, may be prepared by applying a silicone elastomer or fluoroelastomer to serve as a releasing layer. The coated roll is heated to cure the elastomer. Such processing is disclosed, for example, in U.S. Pat. Nos. 5,501,881; 5,512,409; and 5,729,813; the disclosure of each of which is incorporated by reference herein in their entirety. Known fuser surface coatings also include crosslinked fluoropolymers such as VITON-GF® (DuPont) used in conjunction with a release fluid, or fluororesin such as polytetrafluoroethylene (hereinafter referred to as "PTFE"), perfluoroalkylvinylether copolymer (hereinafter referred to as "PFA") and the like.

A heating member is typically provided for thermal fusing of electroscopic toner images. Several heating methods have been described for toner fusing in the prior art. In order to shorten the warm up time, the time required heating the fuser or fixing member to the fusing temperature, induction heating technique has been applied for toner fusing. An image fusing or fixing apparatus utilizing induction heating generally comprises a fusing member such as a roll or belt, an electromagnet component comprised of, for instance, a coil, which is electrically connected to a high-frequency power supplier. The coil is arranged at a position inside the fusing member or outside and near the fusing member. The fusing member suitable for induction heating comprises a metal heating layer. When a high-frequency alternating current provided by the power supplier is passed through the coil, an eddy current is induced within the heating metal of the fusing member to generate thermal energy by resistance to heat the fusing member to the desired temperature.

For example, U.S. Pat. Nos. 7,060,349 and 7,054,589, discloses an image fixing belt suitable for induction heating and a method of manufacturing the same, which is hereby incorporated by reference.

In the context of electrophotographic fusing members, the key components include a fuser belt with a multi-layer configuration comprised of, for example, a polyimide substrate, deposited on the substrate, a metal heating layer comprised of nickel or copper, an optional elastic layer comprised of an elastomer, and an outmost releasing layer.

In a conventional manner, the metal heating layer in such fusing members is deposited on the substrate by using electroplating method. Prior to the electroplating, the surface of the non-conductive substrate, such as polyimide, must be rendered to electrically conductive through several steps, including surface pretreatment such as etching, then applying a catalyst for electroless plating using a colloidal solution comprising, for example, palladium catalyst, followed by electroless plating to form a thin conductive metal layer. A subsequent electroplating process is then applied to form a thick uniform metal layer comprised of, for example, copper and or nickel, with desired thickness. The need for catalyst seeding and electroless plating of the substrate surfaces involved with conventional electroless techniques are some of the key technical challenges for making the fusing belts in order to produce a thick metal coating. Thus, it is desired to devise a more simple and efficient manner of metallization technique for use in making fuser members, for example, fuser belts.

SUMMARY

According to aspects illustrated herein, there is provided a process for forming a fuser member, comprising providing a substrate, coating the substrate with a dispersion comprising metal nanoparticles to form a thin metal layer on the substrate, thermally annealing the thin metal layer to form an electrically conductive metalized layer on the substrate, and electroplating the substrate to form a thick metal layer on the metalized layer.

A further embodiment provides a process for forming a fuser member, comprising providing a polyimide substrate, treating the polyimide substrate with a dispersion comprising silver nanoparticles to form a thin conductive metal layer on the substrate, wherein the dispersion further comprises a stabilizer selected from the group consisting of a hydrocarbylamine having from about 8 to about 20 carbons and a hydrocarbylcarboxylic acid having from about 6 to about 20 carbons, thermally annealing the thin silver metal layer to form an electrically conductive metallized layer on the polyimide substrate, and electroplating the polyimide substrate to form a thick metal layer on the metallized layer.

In yet another embodiment, there is provided an induction heating fuser member comprising a polyimide substrate, a metal heating layer over the polyimide substrate, an elastic layer over the metal heating layer, and an outmost releasing layer over the elastic layer, wherein the metal heating layer is made by the above described processes.

DETAILED DESCRIPTION

In the following description, there is illustrated several embodiments. It is understood that other embodiments may be utilized and structural and operational changes may be made without departure from the scope of the present disclosure.

In a typical electrophotographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, the photoreceptor is charged on its surface by means of an electrical charger to which a voltage has been supplied from power supply. The photoreceptor is then imagewise exposed to light from an optical system or an image input apparatus, such as a laser and light emitting diode, to form an electrostatic latent image thereon. Generally, the electrostatic latent image is developed by bringing a developer mixture from developer station into contact therewith. Development can be effected by use of a magnetic brush, powder cloud, or other known development process.

After the toner particles have been deposited on the photoconductive surface, in image configuration, they are transferred to a copy sheet by transfer means, which can be pressure transfer or electrostatic transfer. In embodiments, the developed image can be transferred to an intermediate transfer member and subsequently transferred to a copy sheet.

After the transfer of the developed image is completed, the copy sheet advances to a fusing station, wherein the developed image is fused to the copy sheet by passing copy sheet the between the fusing member and pressure member, thereby forming a permanent image. Fusing may be accomplished by the application of heat and pressure substantially concurrently by various means: a roll pair maintained in pressure contact; a belt member in pressure contact with a roll; and the like.

In an image fusing system with fast warm up time, an image fusing or fixing apparatus generally comprises a fusing member such as a roll or belt, and an electromagnet component comprised of, for instance, a coil, which is electrically connected to a high-frequency power supplier. The coil is arranged at a position inside the fusing member or outside and near the fusing member. The fusing member suitable for induction heating comprises a metal heating layer. When a high-frequency alternating current provided by the power supplier is passed through the coil, an eddy current is induced within the heating metal of the fusing member to generate thermal energy by resistance to heat the fusing member to the desired temperature. Image fusing members suitable for induction heating are known in the art, and may include a fuser belt with a multi-layer configuration comprised of, for example, a polyimide substrate, deposited on the substrate, a metal layer comprised of nickel or copper, an optional elastic layer comprised of an elastomer, and an outmost releasing layer. The fusing member may further comprise other layers in between the substrate and the metal heating layer, between the metal heating layer and the elastic layer, or between the elastic layer and the releasing layer, for adhesion or other property improvements.

Substrate

The substrate of the fusing member is not limited, as long as it can provide high strength and physical properties that do not degrade at a fusing temperature. Specifically, the substrate is made from a heat-resistant resin. Examples of the heat-resistant resin include resins having high heat resistance and high strength such as a polyimide, an aromatic polyimide, polyether imide, polyphthalamide, polyester, and a liquid crystal material such as a thermotropic liquid crystal polymer and the like. The thickness of the substrate falls within a range where rigidity and flexibility enabling the fusing belt to be repeatedly turned can be compatibly established, for instance, ranging from about 10 to about 200 micrometers or from about 30 to about 100 micrometers.

Metal Heating Layer

The metal heating layer is usually a thin metal film layer and is a layer that generates an eddy current under a magnetic field generated by a coil to thereby produce heat in the electromagnetic induction fusing apparatus, hereby metal producing an electromagnetic induction effect may be used for the metal heating layer. Such a metal can be selected from, for example, nickel, iron, copper, gold, silver, aluminum, steel, chromium, tin, zinc, aluminum, or an alloy thereof according to the use. It may be formed of a single layer or plural layers. When it is formed of plural layers, the respective layers may be made of the same metal or different metals. Suitable thickness of the metal heating layer varies depending on the type of the metal used. For example, when copper is used for the metal heating layer, the thickness thereof ranges from 3 to 100 micrometers or from 5 to 50 micrometers.

Releasing Layer

The releasing layer of the fusing members is typically comprised of a fluorine-containing polymer to avoid toner stain. The thickness of such a releasing layer is ranging from about 3 micrometers to about 100 micrometers, or from about 5 micrometers to about 50 micrometers. Suitable fluorine-containing polymers may include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include a poly(vinylidene fluoride), or a copolymer of vinylidene fluoride with another monomer selected from the group consisting of hexafluoropropylene, tetrafluoroethyelene, and a mixture thereof.

Specifically, fluoropolymers herein include the Viton® fluoropolymers from E. I. du Pont de Nemours, Inc. Viton® fluoropolymers include for example: Viton®-A, copolymers of hexafluoropropylene (HFP) and vinylidene fluoride (VDF or VF2), Viton®-B, terpolymers of tetrafluoroethylene (TFE), vinylidene fluoride (VDF) and hexafluoropropylene (HFP); and Viton®-GF, tetrapolymers composed of TFE, VF2, HFP, and small amounts of a cure site monomer. Further examples of fluoropolymers include polytetrafluoroethylene (PTFE), perfluoroalkylvinylether copolymer (PFA), tetrafluoroethylene-hexafluoropropylene copolymer (FEP) and the like.

In embodiments, there is provided herein an improved method for forming the metal heating layer of a fusing member. The method described herein offer advantages such as avoiding use of expensive palladium catalyst as in conventional metallization on non-conductive substrate.

In the context of electrophotographic belts, inductively heating (IH) fusing technology has been used to make IH fuser belts. For example, U.S. Pat. Nos. 7,060,349 and 7,054,589, discloses a fuser belt and a method of manufacturing the same, which is hereby incorporated by reference. The main advantages of IH fusing include fast warm-up time and energy efficiency. However, conventional processes used to prepare fuser belts, such as IH fuser belts, may involve multiple steps.

The present embodiments provide a metallization process which eliminates the need for the multiple step electroless plating technique used in the conventional processes. Prior to electroplating a thicker metal layer on the substrate, the substrate must be made conductive. In embodiments, the process comprises preparing the conductive surface of a polyimide substrate by coating the substrate in a solution comprising metal particles in the nanometer scale to form a thin layer of metal nanoparticles on the substrate, followed by a thermal annealing step. The nanoparticles may have an average particle size ranging from about 1 to about 100 nanometers, and may comprise a metal selected from the group consisting of silver, gold and copper and the like. Suitable techniques for coating the metal nanoparticles onto the substrate include, but not limited to, dip-coating, ring-coating, web-coating, and spray coating. In a particular embodiment, the nanoparticles used for coating comprises a dispersion of silver nanoparticles. The silver nanoparticles would then be annealed at low temperature, for instance 250 degree C., to make a thin, continuous conductive surface, thus preparing the substrate for further electroplating of other thicker metals to allow for induction heating. In specific embodiments, the thin conductive layer formed on the substrate has a thickness of from about 10 nm to about 3000 nm. The thin but highly conductive metal, such as silver, layer thus formed on the substrate can be used for electroplating to form thick metal layer, thus eliminating conventional multi-step electroless process. In addition, the dispersion may also include an adhesion promoter to further facilitate the formation of the thin metallized layer on the substrate.

As such, this process described herein avoids the need for several steps prior to the electroless nickel plating, including catalyst seeding, as well as use of the electroless metal plating. Seeding with palladium is generally used and, as palladium is expensive and has a short shelf-life, it is a costly step that can be avoided with the present embodiments. The entire metallization process on non-conductive substrate may be shorten and simplified. As a result, the present embodiments provide an improved alternative to the complicated and costly palladium catalyst seeding and electroless nickel plating for metallization on non-conductive substrate. In specific embodiments, the metal nanoparticle-assisted metallization process provides a manner of fabricating fuser belts which can achieve even further reduced warm-up times, as well as further reduced costs, than that of the conventional manner because a thick metal layer, such as for example, copper or nickel, can be formed without the conventional multiple step electroless plating.

According to further embodiments, there is provided a process for forming a fuser belt comprising the application of a layer of metal nanoparticles, for example but not limited to, silver nanoparticles dispersed in a solvent, such as toluene, to be deposited on a polyimide substrate. The application may be by dip-coating, web-coating, or spraying the metal nanoparticle dispersion onto the substrate. The thin layer of metal is then subjected to thermal annealing in which the coated substrate is heated to anneal the metal nanoparticle coating to a thin conductive layer. In one embodiment, the coated substrate is heated at a temperature ranging from about 100 to about 250° C. for about 1 to about 30 minutes to anneal the metal coating. After the metal coating is annealed to the substrate, the metallized substrate is ready to receive the thick metal layers. Subsequently, the process is completed by depositing the copper/nickel layers onto the metallized substrate by conventional electroplating techniques to form a thicker metal layer. The plating solution for electroplating may comprise a platable metal selected from the group consisting of copper, nickel, and cobalt. The remaining silicone and PFA coatings are applied over the copper/nickel layers by also using existing conventional processes. Other metals that can be used for the thick metal layer include copper, nickel, and mixtures thereof. In embodiments, the thick metal layer has a thickness of from about 5 micrometers to about 100 micrometers. In a particular embodiment, the thick metal layer comprises an electroplated copper layer with a thickness of from about 5 micrometers to about 50 micrometers, and an electroplated nickel layer with a thickness of from about 5 micrometers to about 50 micrometers.

In embodiments, the metal nanoparticle dispersion comprises metal particles with an average particle size ranging from about 1 to about 100 nanometers, and the metal particles are dispersed in a solvent media. The metal particles may comprise a metal selected from the group consisting of silver, gold and copper and the like. Suitable solvent media for dispersing the metal nanoparticles may include, but not limited to, hydrocarbon solvents such as hexane, heptane, cyclohexane, octane, decane, dodecane, toluene, xylene, and the like, chlorohydrocarbons, such as chlorobenzene, ether, ketones, alcohols, water, and the mixture thereof. The dispersion may contain, for example, from about 5 to about 90 percent of the metal particles. Any conventional methods may be employed for preparation of the metal nanoparticles, including, but not limited to, physical vapor evaporation processes, and chemical processes such as reduction of the corresponding metal compounds with suitable reducing agents, electrochemical processes, and photochemical processes. For instance, as described in the experimental example, silver nanoparticles may be prepared from reduction of silver acetate with phenylhydrazine as reducing agent.

In certain embodiments, the dispersion comprising metal nanoparticles suitable for forming the thin metal layer may further comprise a stabilizer. The stabilizer has the function of minimizing or preventing the metal nanoparticles from aggregation in a liquid and optionally providing dispersibility of the metal nanoparticles in a coating solution. Further, suitable stabilizer may be thermally removable, which means that the stabilizer can be caused to dissociate from the metal nanoparticle surface under certain conditions such as through heating during the annealing step. The heating may be accomplished to a certain temperature ranging from about 80 to about 350 degree C., or from about 100 to about 250 degree C., under normal atmospheric conditions or at a reduced pressure of for example from several mbars to about $10^{-3}$ mbar. The thermal dissociation of the stabilizer from the metal nanoparticles at a temperature such as for example lower than about 350 degree C. may result in the evaporation of the stabilizer or decomposition of the stabilizer into gaseous forms.

In embodiments, the stabilizer may be an organic stabilizer. The term "organic" in "organic stabilizer" refers to the presence of carbon atom(s), but the organic stabilizer may include one or more non-metal heteroatoms such as nitrogen, oxygen, sulfur, silicon, halogen, and the like. Any suitable stabilizers may be utilized for the metal nanoparticles described herein. Exemplary organic stabilizers include, for instance, thiol and its derivatives, amine and its derivatives, carboxylic acid and its carboxylate derivatives, polyethylene glycols, and other organic surfactants. In embodiments, the organic stabilizer is selected from the group consisting of an organothiol such as for example butanethiol, pentanethiol, hexanethiol, heptanethiol, octanethiol, decanethiol, and dodecanethiol; an amine such as for example ethylamine, propylamine, butylamine, penylamine, hexylamine, heptylamine, octylamine, nonylamine, decylamine, and dodecylamine; a dithiol such as for example 1,2-ethanedithiol, 1,3-propanedithiol, and 1,4-butanedithiol; a diamine such as for example ethylenediamine, 1,3-diaminopropane, 1,4-diaminobutane; a mixture of a thiol and a dithiol; and a mixture of an amine and a diamine. Organic stabilizers containing a pyridine derivative (e.g., dodecyl pyridine) and/or organophosphine that can stabilize silver-containing nanoparticles are also included as a stabilizer in embodiments of the present embodiments.

In embodiments, the stabilizer is an organoamine such as for example butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, diaminooctane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine, and the like, or mixtures thereof.

In embodiments, the stabilizer is a carboxylic acid having at least 4 carbon atoms or from 4 to about 20 carbon atoms. Such carboxylic acids may include butyric acid, pentanoic acid, hexanoic acid, heptanoic acid, octanoic acid, nonanoic acid, decanoic acid, undecanoic acid, dodecanoic acid, tridecanoic acid, myristic acid, pentadecanoic acid, palmitic acid, heptadecanoic acid, stearic acid, oleic acid, nonadecanoic acid, icosanoic acid, eicosenoic acid, elaidic acid, linoleic acid, and palmitoleic acid.

The stabilizer may be introduced to metal nanoparticles during the preparation of the metal nanoparticles, or through exchange of existing stabilizer in the metal nanoparticles with a second stabilizer. One, two, three or more stabilizers may be used. In embodiments where two or more stabilizers are used, each stabilizer may be present at any suitable weight ratio or molar ratio such as for example from about 99(first stabilizer):1(second stabilizer) to about 1(first stabilizer):99(second stabilizer). The amount of the stabilizer used is for example about 1 or more molar equivalents per mole of metal compound, or about 2 or more molar equivalents per mole of metal compound, or about 10 or more molar equivalents per mole of silver compound, or about 25 or more molar equivalents per mole of metal compound.

Subsequently the substrate thus coated with thin metal layer is electroplated in the conventional manner. Any suitable conventional electroplating techniques may be utilized for the electroplating steps. Useful electroplating baths are not limited and can be any of conventional electroplating baths. In certain embodiments, the electroplating solution for electroplating comprises a platable metal selected from the group consisting of copper, nickel, and cobalt, chromium, and the like. For instance, useful electroplating baths may include, but not limited to, conventional copper sulfate plating solution, Watts bath for nickel plating, and the like. The electroplating conditions may be conventional. For example, electroplating can be conducted at a plating solution temperature of from about 25.degree. C. to about to about 60.degree. C. and a current density of from about 1 to about 3 A/dm$^2$, and is continued until a deposit of the predetermined thickness is obtained.

In a specific embodiment, further layers are formed over the thick metal layer. For example, the process may further include depositing, in sequence, a first adhesive layer over the thick metal layer, an elastic layer comprised of a silicone polymer over the adhesive layer, a second adhesive layer over the elastic layer, and an outmost releasing layer comprised of a fluoropolymer over the second adhesive layer. The fluoropolymer comprises a monomeric repeat unit that may be selected from the group consisting of vinylidene fluoride, hexafluoropropylene, tetrafluoroethylene, perfluoroalkylvinylether, and mixtures thereof.

In further embodiments, there is provided a fuser member, such as a fuser belt, made from the processes described above. In a particular embodiment, the fuser belt made from the processes above is an induction heating fuser member. In this embodiment, the induction heating fuser member comprises a polyimide substrate, a metal heating layer over the polyimide substrate, an elastic layer over the metal heating layer, and an outmost releasing layer over the elastic layer, wherein the metal heating layer is made in accordance with the processes described above. In one embodiment, the metal heating layer comprises a thin silver metal layer with a thickness ranging from about 10 nanometers to about 3000 nanometers and a thick metal layer comprised of electroplated copper or nickel having a thickness ranging from about 10 micrometers to about 100 micrometers. In this embodiment the thin silver layer possesses an electrical conductivity of at least about 5000 S/cm. The present embodiments will be useful in induction heating fuser belts as the electromagnetic induction heating unit will not require contact with the fuser belt to function as intended. The current can be sensed by the metal layer in the induction heating fuser belt so that the heat is generated accordingly. In addition, the present embodiments also provide for an electrophotographic imaging apparatus comprising the fuser member.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below and is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Example 1

Preparation of silver nanoparticles: Silver acetate (3.34 parts) and oleylamine (13.4 parts) were added in 40 parts of toluene and stirred at 55° C. for 5 min. Phenylhydrazine (1.19 parts) solution in toluene (10 parts) was added into the above solution slowly with vigorous stirring. The solution became dark red-brown in color. The solution was stirred at 55° C. for an additional 10 min. The solution prepared above was added drop-wise to a mixture of acetone/methanol (150 parts/150 parts). The precipitate was filtered, washed with acetone, followed by methanol. The gray solid obtained was dissolved in 50 parts of hexane, which was added drop-wise to a solution of oleic acid (14.12 parts) in hexane (parts) at room temperature (around 23° C.). After stirring for 30 min, the solid was collected by filtration, washed with methanol, and drying (in vacuum). The gray powder contained approximate 68% of Ag content based on TGA analysis.

A coating solution was prepared by dispersing 30 parts of the silver nano-powder into 170 parts of solvent, for example, toluene. The silver nanoparticle had average particle size of about 5 nanometers based on TEM analysis.

Example 2

Preparation of a fuser member using prepared silver nanoparticles: A polyimide substrate (Kapton® film from DuPont Chemical Co. Wilmington, Del.) was treated by cleaning with detergent solution, etching with alkali hydroxide solution, followed by treatment with an aminosilane coupling agent. The substrate was then coated with the silver nanoparticle dispersion of Example 1 using dip-coating technique, followed by annealing at 250 degree C. for 10 min, to form a thin silver metal layer with an electrical conductivity of about $2.5 \times 10^4$ S/cm.

The Ag-deposited substrate was then electroplated in a copper electrolytic plating bath (Bright Acid Copper Bath from Caswell Inc., Lyons, N.Y.) to form a copper layer with about 10 μm, followed by second electroplating step in a nickel electrolytic plating bath (Bright Nickel Bath from Caswell Inc., Lyons, N.Y.) to form a nickel metal layer with 10 μm.

The remaining silicone and PFA coatings can be applied over the nickel layer by using conventional coating formulation and processes.

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process for forming a fuser member, comprising:
   providing a substrate;
   forming a metal heating layer for induction heating comprises the steps of:
   a) coating the substrate in one pass with a dispersion comprising silver nanoparticles to form a thin metal layer on the substrate;
   b) thermally annealing the thin metal layer to form an electrically conductive metalized layer with a thickness of from about 10 nanometers to about 3 micrometers on the substrate and;
   c) electroplating the substrate to form a thick metal layer on the metalized layer and;
   depositing an outmost releasing layer comprising a fluoropolymer material to avoid toner stain over one or more layers on top of the metal heating layer;
   thereby forming a fuser member;
   wherein the annealing at a temperature ranging from about 100 to about 250° C. for about 1 to about 30 minutes to form the electrically conductive metalized layer on the substrate, and wherein the electrically conductive metalized layer formed on the substrate has an electrical conductivity of at least about 5000 S/cm.

2. The process of claim 1, wherein the silver nanoparticles is prepared by a method comprising the step of contacting silver acetate with phenylhydrazine in the presence of a stabilizer.

3. The process of claim 2, wherein the stabilizer is selected from the group consisting of an organoamine, an organic carboxylic acid, an organothiol, and mixtures thereof.

4. The process of claim 3, wherein the silver nanoparticle dispersion further includes a second stabilizer and further wherein the first and second stabilizers are present in the silver nanoparticle dispersion in a weight ratio of 99(first stabilizer):1(second stabilizer) to about 1(first stabilizer):99 (second stabilizer).

5. The process of claim 3 further including a step of thermally removing the stabilizer after the thin metal layer is formed on the substrate.

6. The process of claim 1, wherein the silver nanoparticles have average particle size ranging from about 1 to about 100 nanometers.

7. The process of claim 6, wherein the step of thermally removing the stabilizer is performed at a temperature of from about 80 to about 350° C.

8. The process of claim 1, wherein the thin metal layer formed from the silver nanoparticles has a thickness of from about 10 nanometers to about 3000 nanometers.

9. The process of claim 1, wherein the substrate comprises a polymer selected from the group consisting of polyimide, an aromatic polyimide, polyether imide, polyphthalamide, and polyester.

10. The process of claim 9, wherein the substrate is further surface modified with an aminosilane coupling agent.

11. The process of claim 1, wherein the plating solution for electroplating comprises a platable metal selected from the group consisting of copper, nickel, and cobalt.

12. The process of claim 1, wherein the thick metal layer has a thickness of from about 5 micrometers to about 100 micrometers.

13. The process of claim 1, wherein the thick metal layer comprises an electroplated copper layer with a thickness of from about 5 micrometers to about 50 micrometers.

14. The process of claim 1 wherein the one or more layers comprises a first adhesive layer over the thick metal layer, an elastic layer comprising a silicone polymer over the adhesive layer, and a second adhesive layer over the elastic layer.

15. The process of claim 14, wherein the fluoropolymer material comprises a monomeric repeat unit that is selected from the group consisting of vinylidene fluoride, hexafluoropropylene, tetrafluoroethylene, perfluoroalkylvinylether, and mixtures thereof.

* * * * *